(12) United States Patent
Peach (10) Patent No.: US 7,085,926 B1
(45) Date of Patent: Aug. 1, 2006

(54) ELECTRONIC CONTRACTS

(75) Inventor: Nicholas Anthony John Peach, Salisbury (GB)

(73) Assignee: International Business Machines Incorporation, Armonk, NY (US)

( * ) Notice: Subject to any disclaimer, the term of this patent is extended or adjusted under 35 U.S.C. 154(b) by 0 days.

(21) Appl. No.: 09/576,223

(22) Filed: May 22, 2000

(30) Foreign Application Priority Data

May 22, 1999 (GB) .................................. 9911875.4

(51) Int. Cl.
*H04L 9/32* (2006.01)
*G06F 7/04* (2006.01)

(52) U.S. Cl. .................. 713/160; 713/176; 705/64; 705/80; 726/2

(58) Field of Classification Search ............... 713/176, 713/187, 188, 200; 707/9, 237; 705/1, 45, 705/54, 57, 80, 52; 709/226; 380/3
See application file for complete search history.

(56) References Cited

U.S. PATENT DOCUMENTS

| | | | | |
|---|---|---|---|---|
| 5,214,702 A | * | 5/1993 | Fischer | 380/30 |
| 5,475,753 A | * | 12/1995 | Barbara et al. | 713/187 |
| 5,553,143 A | * | 9/1996 | Ross et al. | 705/59 |
| 5,606,609 A | | 2/1997 | Houser et al. | 713/179 |
| 5,915,024 A | * | 6/1999 | Kitaori et al. | 713/176 |
| 5,930,357 A | * | 7/1999 | Fukui | 705/59 |
| 6,067,531 A | * | 5/2000 | Hoyt et al. | 705/35 |
| 6,138,119 A | * | 10/2000 | Hall et al. | 707/9 |
| 6,185,683 B1 | * | 2/2001 | Ginter et al. | 713/176 |
| 6,275,937 B1 | * | 8/2001 | Hailpern et al. | 713/188 |
| 6,282,523 B1 | * | 8/2001 | Tedesco et al. | 705/45 |

FOREIGN PATENT DOCUMENTS

| | | |
|---|---|---|
| EP | 0 676 877 A2 | 11/1995 |
| EP | 0 798 892 A2 | 1/1997 |

* cited by examiner

*Primary Examiner*—Christopher Revak
(74) *Attorney, Agent, or Firm*—Connolly, Bove, Lodge & Hutz, LLP (57) ABSTRACT

The invention provides a digital contract comprising a sealed package comprising: a header package comprising: rules defining any sealed packages to be included in said contract; a validating party who is to validate said header package; and a sealing party who is to seal said package; a body containing at least a portion of the content of the package; and a validating signature generated from said rules and said body according to a first key belonging to said validating party; any sealed packages defined in said rules; and a sealing signature generated from said header package and any of said sealed packages according to a first key belonging to said sealing party. Further provided is contract management software for generating, validating, exchanging and managing such contracts.

18 Claims, 4 Drawing Sheets

ELECTRONIC CONTRACTS

FIELD OF THE INVENTION

The present invention relates to a method and apparatus for creating, exchanging, storing and validating digital equivalents of paper contracts.

BACKGROUND OF THE INVENTION

Many existing Public Key certification techniques exist and all work on the same principle. A file to be certified is processed by an algorithm that also uses the private key of a public/private signature key pair, to produce a signature file, FIG. 1. The public key of the public/private key pair can then be used to verify that, given the original file, the signature file was the product of the original process, FIG. 2. It is computationally unfeasible to produce a file different to the original that, when used with the relevant algorithm, would produce the same signature file with the public key.

An example of a digital document verification system based on such techniques is disclosed in U.S. Pat. No. 5,606,609, Houser et al.

An example of an encryption based scheme for ensuring document authenticity is Cryptolopes produced by IBM Corporation. Cryptolopes comprise self-executing code which requires a user to be on-line to a 3rd party and use a specific Public Key Infrastructure. The essence of Cryptolopes is to deliver a piece of encrypted content to a specified user but only after communication with a third party to authorise it. Cryptolopes are therefore not particularly useful for real-time verification of the authenticity of documents.

In the meantime, many governments are beginning to allow digital signature files to be legally valid in courts. The shortcoming of simple digitally signed documents is that a document along with its signature file could only be considered the most basic possible application of digital signature technology. Other than verifying that the signature file is valid, a computer can have no knowledge of the contents of the document, or whether the contents are legally binding, and this is critical to where the document is a contract. As such, its use still requires the skill of a lawyer and the courts to determine its legality.

SUMMARY OF THE INVENTION

The invention enables the provision of a digital contract that is: self-validating; acceptable in a court of law; extremely simple for end-users; capable of being applied to a huge variety of uses; suitable for use on the Internet; capable of employing existing or future digital certification algorithms; and is stored as a single file.

There are two aspects to the invention: contracts, containing their own validation rules, and contract management software (CMS) that processes the rules to, inter alia, determine the validity of the contract.

A digital contract according to the invention can be dynamically generated by a CMS within an entity, for example a terminal, filled in, signed, passed to another entity (a person or a computer), signed by the entity's CMS, passed back and verified on the spot, and it is the inclusion of computer readable rules within the contract that makes it possible to so automatically and easily validate the contract. For example, it would be possible using the invention to sign up to an insurance policy on the Internet and receive the completed contract policy in one sitting.

The invention can replace, for example, insurance documents, television licences, the piles of paper receipts in wallets, software licences, medical records and so on, in electronic form so that they can be carried around on, for example, a smartcard and viewed and manipulated on a PC or PalmPilot and exchanged on request between all of these units.

Contracts according to the invention are built up in stages while being passed around computers until completion, without involving a 3rd party check as in the case of Cryptolopes.

DESCRIPTION OF THE DRAWINGS

Embodiments of the invention will now be described with reference to the accompanying drawings, in which.

DETAILED DESCRIPTION OF THE INVENTION

Figure 3:
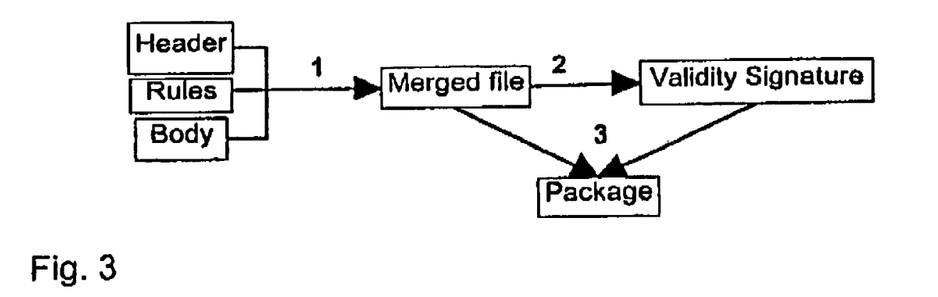
FIG. 3 shows the creation of a package portion of the contract according to the invention.

The invention provides one or more nested packages with the top level package being referred to as a contract. Referring to FIG. 3, a package according to a preferred embodiment of the invention contains:

Header comprising a number, preferably unique, identifying a package type;

Rules to describe when the package is valid;

Body that holds general data such as a HTML or an XML page and/or any other type of suitable data;

Package validity signature that signs all of the above to prevent fraud;

Any other packages needed to complete the validity of this package;

Any database style of package; and

Sealing signature that closes out the package to make it valid (if the signature obeys the rules).

Figure 1:
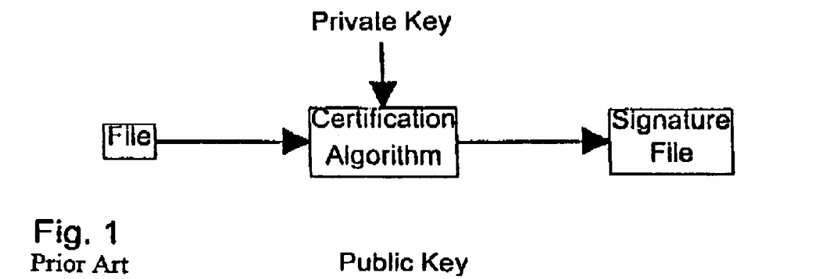
FIG. 1 shows the conventional production of a signature file.
Figure 2:
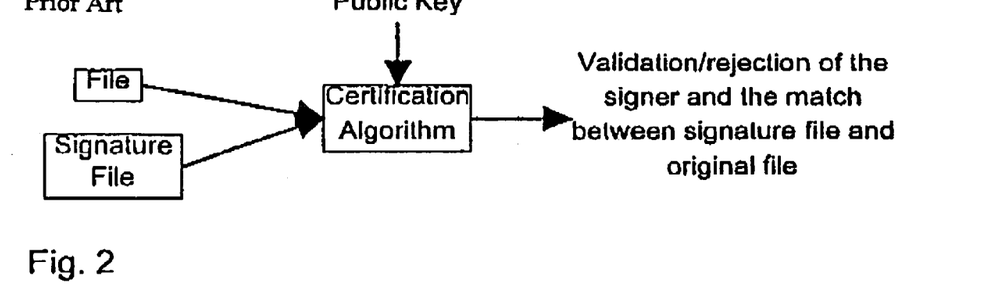
FIG. 2 shows the validation of the match between signature file and original file of FIG. 1 and confirmation of signer.

As shown in FIG. 1, signature technology normally produces a second file that has to be present with the original file to confirm validity. In the preferred embodiment, the contract comprises a single file into which original data and signature data are merged. The first step in producing the contract is to merge the header, rules and body to produce a single file (1), FIG. 3. This merging step may be implemented by zipping the header, rule and body into a single compressed file using, for example, Pkzip from Pkware Inc, although it will be seen that any other suitable application may be employed, even to the extent of simply concatenating the files. A signature file is then produced from the merged file (2) using a certification algorithm (the key to be used for this step is discussed later). The signature file is then merged with the merged file to produce a header package (3). This header package does not yet contain a sealing signature so it is not yet considered legally valid.

Figure 4:
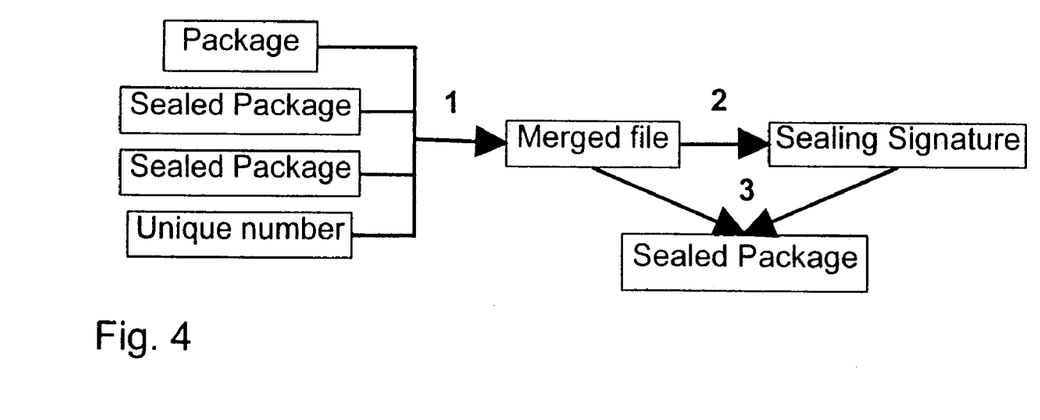
FIG. 4 shows the sealing the package of FIG. 3 along with other constituent packages of the contract.

In accordance with the rules, a contract or any sealed package may have other sealed packages incorporated before a sealing signature is applied. FIG. 4 shows the structure of a package containing two additional sealed packages. Before the sealing of a package, a unique number is generated and added. All constituent packages and the unique number are then merged (1). A sealing signature is generated by the certification algorithm (2) and the final merge takes place (3).

It should be seen that in the preferred embodiment, the unique number is not stored within the validity signature region, because it would require a fresh validity signature to produce a valid outcome. Instead, it is generated just before the sealing signature is applied and stored within the scope of the sealing signature.

Figure 5:
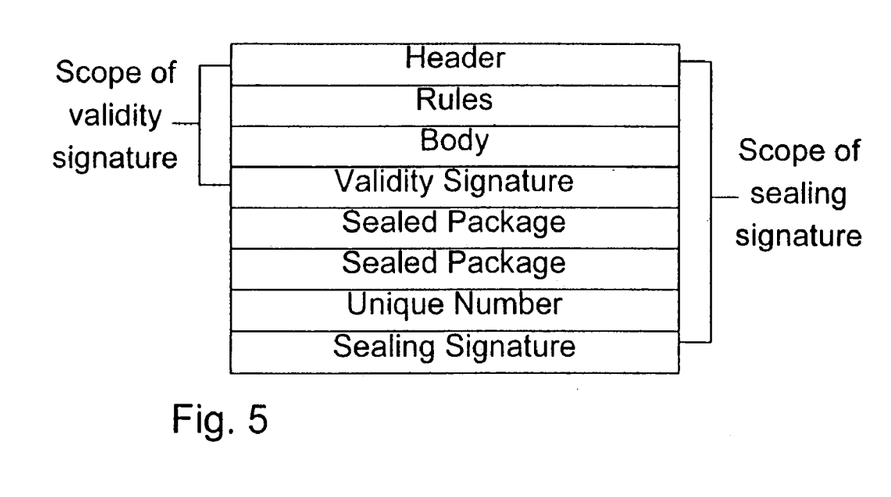
FIG. 5 shows the constituents of the sealed package of FIG. 4.

The process of validation involves unzipping the package, viewing the contents and seeing if the rules have been followed. FIG. 5 shows the example sealed package when unzipped. The validity of a package is determined by contract management software (CMS) reading the package rules. The rules determine:

which, if any, packages must be present. The rules are preferably written in a script language which can be interpreted by a CMS. Each element of the rules describing a package is preferably in the form of a URL pointing to the location of the required package which could therefore be resident on the machine on which the CMS resides or remote from the CMS;

any data which must be present in values in the body. Thus, if a database package is to be included in the contract, the associated element of the rules preferably indicates the field name in a body's HTML file in which the data is to be displayed or from which the data is to be used to generate a database package;

the key or an indicator of the key which must be used for the sealing signature and validity signatures. This can be either an absolute indicator or a relative indicator. For example, if a garage is issuing MOT's, the validity signature key rule will indicate the key of the Department of Transport is required and so the key will need to be obtained from the Department of Transport to validate the header. If the sealing signature key rule indicates the key of the DoT, the package may need to be relayed by the garage to the absolute location indicated by the key rule for sealing before becoming a contract. Alternatively, the sealing signature key rule may indicate that the key of the local CMS is to be used. Thus, the key of whichever garage is issuing the MOT and so generating the contract can be used; and optionally, any authorisation required to read a package. Thus, instead of one CMS passing a simple message to another CMS requesting a package, the requesting CMS could in fact generate a requesting package verifying its identity to the receiving CMS, so that the receiving CMS only responds if it determines the requesting CMS is authorised to read the requested package.

When used in different combinations, these simple rules combined with the nested package structure can produce any style of verifiable contract.

Take for example a common paper contract—a certificate of road worthiness, an MOT, issued on behalf of the Department of Transport by a garage. There are basic elements that make it a legally acceptable document:

The paper is security printed and numbered;

A minimum set of fields, such as registration number, must be completed;

A date is entered;

Vehicle details are present; and

An embossed stamp carries the identification of a registered MOT centre.

Using a present invention, a digital contract according to the invention can directly model these elements to provide the equivalent of the security paper. In this case the Department of Transport, draws up the new type of contract by producing a package of the type shown in FIG. 3. A package type number is first generated and this is placed in the header of the package. The package number is preferably unique and so can most easily be generated from a combination of, for example, the licence number of the Department of Transport CMS and an incremental package type number held within the CMS. It will nonetheless be seen that many alternative schemes are possible.

Rules for the contract are then set out, and in the present example, these specify the locations for a sealed time package; a sealed vehicle package or alternatively a vehicle registration mark which must be included in the contract.

The body can contain any sort of data. An HTML page is useful for most users, allowing them to use a conventional browser to view the contract as a formatted page, an equivalent of the print on the MOT. The validity signature is the equivalent of the security printing techniques, because it shows the Department of Transport as the contract issuer has authorised the contract by signing it.

Figure 6:
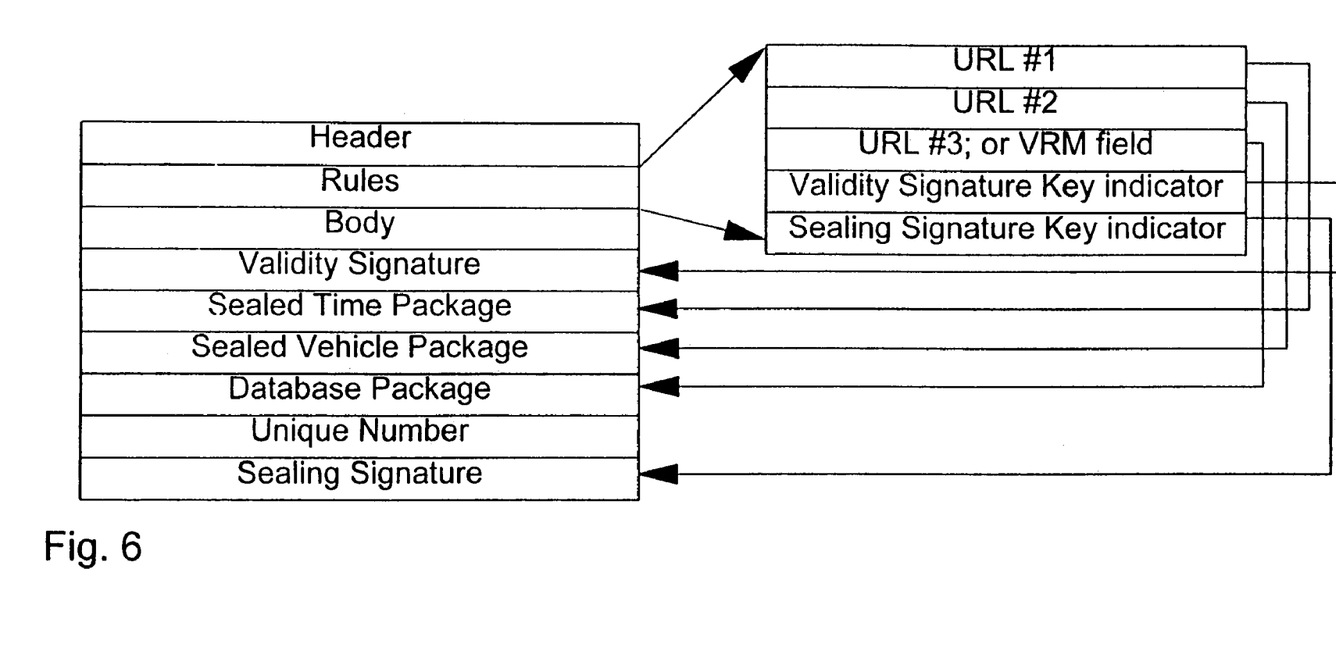
FIG. 6 shows a digital contract generated according to the invention, equivalent to the MOT issued by the Department of Transport.

Every time a new instance of that contract is required for issuing by a garage, the garage can use the package produced by the Department of Transport to produce the contract illustrated in FIG. 6.

In the example, the date information required for the contract is included as a sealed time package. Let us assume that every hour the Greenwich Royal Observatory generates a new instance of a sealed time package, comprising a Body containing an hourly updated date/time field, and publishes it on a web site. The sealing signature, for the sealed time package, uses the Royal Observatory's key. Furthermore, assume that such an institution is considered widely trusted and a court of law would accept the sealed time package instance as valid. Thus, the rule in the contract says that there must be a valid package of such a type.

Furthermore, let us assume that vehicles are issued with a sealed vehicle package containing details such as make, model number, colour, chassis number etc. The sealing signature for the sealed vehicle package is the manufacturers' key. Again a rule in the contract says that there must be a valid package of such type.

Rules can also be used to provide an either/or option. Details such as a vehicle registration mark (VRM) could be handled in one of two ways. The Driver and Vehicle Licensing Agency (DVLA) could issue the vehicle with a sealed package equivalent to the vehicle registration document.

Alternatively, the HTML page stored in the body of the contract could be provided with edit boxes to allow the manual entry of the VRM when the HTML page is displayed within a browser. To avoid needing to re-validate the package containing the body, the entered VRM data is stored within a database structure outside the scope of the validity signature. This database (which, for consistency, could be a type of unsealed package) is added to the other packages before the contract is sealed by the garage. The contract rules could also enable access to the values stored in the database to perform validation checks. For example, in an insurance contract, the rules would probably contain much more field level validation.

Thus, for an MOT, the rules state that there must either be a sealed vehicle registration package (optionally with matching values in the Sealed Vehicle Package) or there must be a value in the VRM field in the database package.

The garage CMS continues by generating the unique number for the contract possibly by combining a serial number with an identifier of the garage, as was the case for the Department of Transport. The sealing signature is then applied to form the equivalent of the embossed MOT centre stamp.

In operation, the MOT centre passes a copy of the sealed contract to the client's CMS. The client's CMS opens up the contract, validates all the rules on the enclosed packages and signature keys and can thus confirm validity of the contract.

Giving the digital contract MOT to the client could be performed in two different ways. It could be emailed to the client, once the client had provided the sealed vehicle package to the garage, or the client could carry a piece of hardware, a handheld device such as a PalmPilot or a smartcard. In this case the CMS running on the client's platform accepts and stores the MOT and performs an on the spot validation (assuming the public keys for the various sealed packages are available). The client then takes the platform home and the CMS on a home PC performs a synchronise with the platform.

It will be seen that a contract according to the invention has several advantages over a conventional MOT document:

Reduced Fraud. An unsealed MOT contract is valueless. It requires a sealing signature using a key defined in its rules. Signing a package is a positive, traceable act, so issuing fraudulent MOTs becomes very risky.

Reduced Cost. No security-printed documents are required. All data contained within the contract can be extracted and stored in a database.

Increased User Convenience. A rule in the MOT could state that the value in the date package couldn't be more than a year old. When the CMS reads this, it could then remind the client to get a new MOT ahead of time. After the date in question, that MOT will read as invalid.

The convenience and simplicity for a user depends on the second element of the invention, the CMS, since this tool mediates the incoming and outgoing contracts. It will be seen from the above description that the Contract Management Software (CMS) is responsible for combinations of the following:

Assembling Contracts;
Validating packages;
Handling external requests for a package;
Querying the user about passing a package to an external entity;
Accepting and securely storing packages in an encrypted package database;
Where possible, allowing user access to all packages through an easy to use navigator tool;
Synchronising with other CMS's owned by a user or organisation;
Backup of the package database;
Informing users of expiring packages (out of date etc.); and
Deleting packages.

Figure 7:
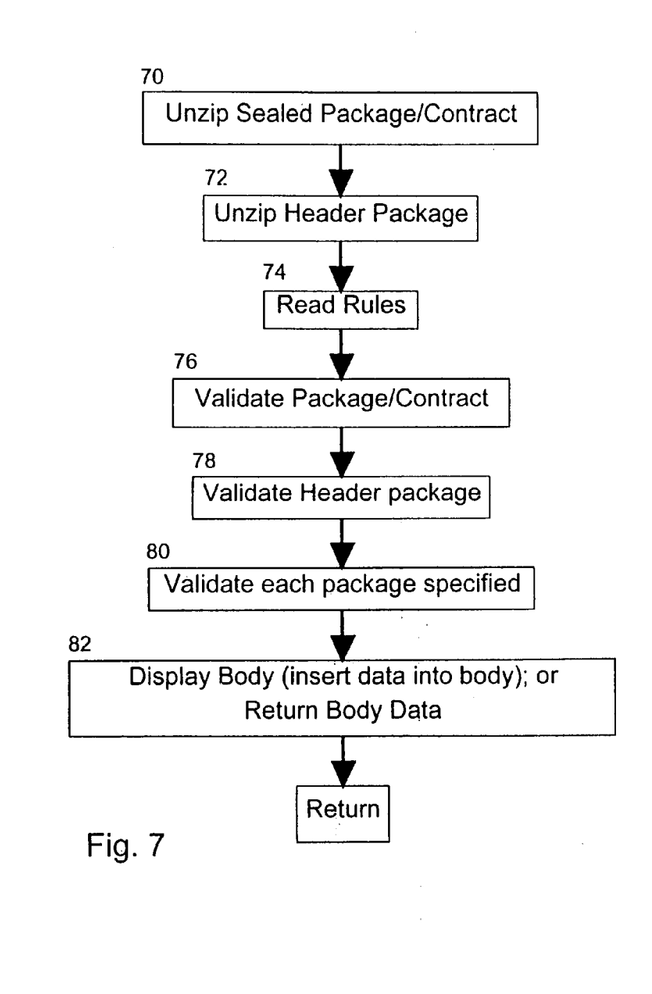
FIGS. 7 and 8 illustrate the operation of CMS functions for validating and generating packages.
Figure 8:
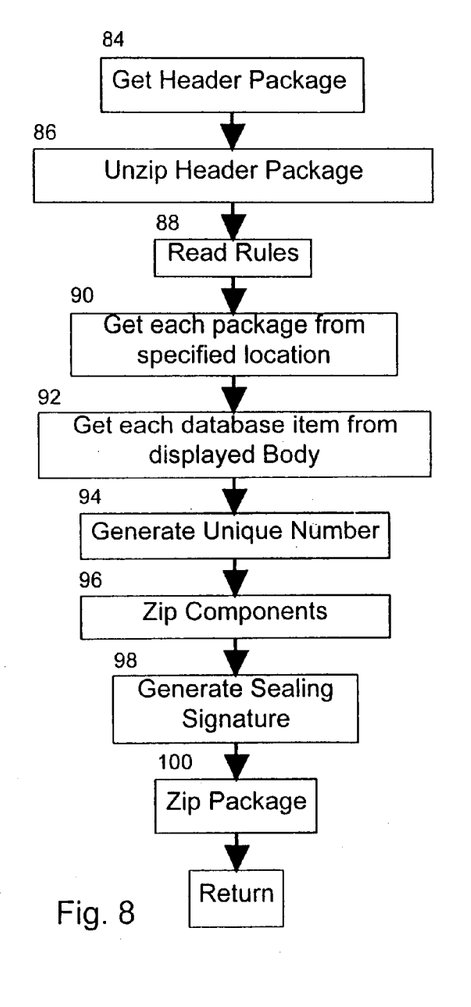

FIGS. 7 and 8 respectively illustrate the operation of CMS functions for validating and displaying a sealed package or contract and generating a sealed package or contract. Referring to FIG. 7, when a CMS is passed a contract, it unzips the contract and then unzips the components of the package other than the sealing signature, step 70. The header package then needs to be unzipped and the components of the header package other than the validity signature are unzipped, step 72, to produce, for example, the components shown in FIG. 6. The CMS can now read the rules, step 74, to find the keys required to validate both the entire contract and the header package, steps 76 and 78. If the public keys are available locally, then these may be used in preference to connecting to the Internet to download the keys from a designated URL. If the keys are to be downloaded from a URL, then the CMS can be adapted to require such keys to be signed by a trusted 3rd party, whose public key the CMS possesses.

It should be noted that all Public Key Infrastructures (PKI) rely on the process of key signing to make validation practical in the real world. This is the process of entity 'A' using their private key to sign the key of entity 'B'. If another entity holding a copy of the public key of entity 'A' but not of entity 'B', is presented with the key of entity 'B', the entity can recognise that it has been signed with the key of entity 'A' and so can make a judgement about the trust to place in that key. It is possible that the only recognised key is someway up the chain of signings and so it could be necessary to store the key hierarchy in the package, otherwise there would be no likelihood of a validation being possible.

In step 80, the CMS then uses the same process to validate each sealed package included in the contract. If a sealed package is being validated the CMS function can be adapted to return any data contained in the sealed package to the calling routine, step 82. Thus, for example, the time contained in a time package can be returned to the higher level instance of the validation function for the MOT contract. Where many packages are nested, data returned from the lowest level packages can thus percolate upwards through the validation routines.

Alternatively, if the validation function is operating at the contract level it can proceed to display the contract Body inserting data returned from lower level packages and data contained in any database packages in the contract into the displayed Body.

Referring now to FIG. 8, which illustrates the operation of the CMS when requested to generate a sealed package or contract of a given type. At step 84, the CMS uses the package identifier to obtain a header package which would typically be stored locally. At step 86, the header package is unzipped and the components of the package other than the validity signature are unzipped to expose the rules by which the package is to be constructed. The rules are read at step 88, causing the CMS to iterate through each of the URL's provided for the required sealed packages, step 90. It will be seen that these URL's could in fact launch CGI scripts across the Internet which cause a similar function on the remote computer to generate the required sealed package at run-time. If on the other hand, the CMS detects that data must be entered manually, then the contract Body is displayed and the user is prompted to enter the required information which is stored as a database package, step 92. The contract's unique number is then generated at step 94, after which the zipped header package is merged with the remaining components, step 96 and a sealing signature is generated, step 98. The entire package is then zipped, step 100, and returned by the CMS to wherever it is required.

The remaining features of the CMS depend on its environment, that is, whether it operates within a home computer and for example will need to manage a variety of different contracts for a given user; or if it operates in a smartcard either dedicated to a single merchant or for general purpose use for carrying a user's contracts between a contract issuing device and the home computer; or if it primarily for generating a single type of contract for many different users.

The CMS could be written to run on most platforms, however, the same Java CMS, could run on PCs, Macs, Unix boxes, smart cards and even check-out terminals such as the 4690/OS from IBM which now supports Java. It will be seen that handheld devices and smartcards would require a more cut down version particularly in relation to their user interface while a CMS running on embedded systems would be accessed only through its API. On a PC, a navigator could provide a treeview within which all the packages are accessible. Branches could be user defined or based on data held in the header of contracts. This would allow a user to easily find and open any contract.

Nonetheless, the following shopping example demonstrates some examples of CMS in use, where a user carries a CMS in a smartcard that has a LCD screen and soft-configured buttons.

1. On pulling into a car park, a user inserts the smartcard into an entry barrier. An embedded system CMS in the entry barrier passes a parking contract to the smartcard CMS. The parking contract comprises a Body containing the arrival time behind a validating signature and then a unique number all behind a sealing signature.

It will be seen that a contract when included in another contract is termed a sealed package, although it could be used as a stand-alone contract. It will also be seen that in the case of a parking barrier, the time could form the body of the contract, and so in contrast to the MOT example, the header package is generated and the validating 110 signature is applied dynamically. Finally, it should be seen that in this case, the contract validating party is also the same as the sealing party.

2. The user includes liquor in a purchase. On arrival at the checkout, the user connects the smartcard to the checkout to pay.

3. A CMS in the checkout requests the CMS in the smartcard for a type of contract to prove age. The smartcard CMS indicates on the LCD screen that the contract has been requested. This is because the user has set up the CMS to ask before passing out that contract. The user presses OK and a contract is passed to the checkout CMS.

4. The contract is opened by the checkout CMS. The body of contract contains only a date of birth and a JPEG image of the user. It is a maximum privacy identification, but it is a valid contract signed by a trusted signer. There could be other identification contracts in the smartcard containing name, address and other information, but they are not needed in this case. The checkout indicates the age is good and the checkout clerk views the JPEG images and is satisfied that the ID belongs to the user. The transaction proceeds and the remaining items are billed.

5. The checkout CMS asks the smartcard CMS for a package of the type issued by the parking barrier. This package type is not set-up to alert the user first, so a copy is immediately passed to the checkout CMS. The checkout CMS completes the parking contract and applies a sealing signature.

6. The sealed parking contract is passed to the smartcard CMS. The rules on the contract expire any previous version of the parking contract stored in the smartcard.

7. The checkout CMS also passes a shopping receipt in the form of a signed contract to the smartcard CMS.

8. When the user drives to the exit barrier of the mall, a barrier CMS asks for a parking contract. The now validated package is passed to the barrier CMS. The barrier CMS validates the contract and raises the barrier. If the user had not purchased in a store, the contract could still be validated at a parking payment station that has a CMS incorporated.

9. On returning home, the smartcard CMS is synchronised with a PC CMS. The receipt contract is copied over, and the PC CMS copies the contract to a directory for storage of such items with, for example, a six month life. Similarly, a user's home accounts package could also be updated with the latest changes.

Other uses of the invention include: Software licenses, so that when a piece of software starts on a host machine, the software requests the CMS for a valid contract; Television licenses; Car, home and other insurance; Mortgages; Product Guarantees; Payment Receipts; Pay-per view and television access tokens; Internet downloaded music playback licenses; Road tolls payment tokens; any task that requires positive verification such as commands issued between mission-critical systems; or distributed device architectures (e.g. JINI) that require inter-device validation and authorisation.

It should also be seen that it is within the scope of the invention for any part or all of a package to be encrypted using the public key of the intended recipient, and this could be developed to produce useful additional services.

Also, if it is required that a contract only be valid if held on a particular user's CMS, then it would be necessary to include a package in the contract that the user had to sign, requiring the use of the user's private key. A 3rd party CMS who wishes to further confirm the user's identity could check by asking the user to digitally sign a message at the time the 3rd party CMS is in communication with the user's CMS. If the user's public key decrypts the message and the same key works with the user's contract, then the user's identity is confirmed.

In the preferred embodiment, the rules at any nested level of sealed package within the contract indicate the party supplying the sealing signature at that level of the sealed package. It will be seen, however, that the rules at one level may in fact indicate the parties supplying the sealing signatures of any sealed packages contained in that one level. In the preferred embodiment, these could be associated with any URL within the rules indicating the location of any sealed packages. This, however, has the disadvantage that a sealed package would not have within itself an indication of the party who had sealed it.

It should also be noted that, while the body and the database package content described above contain absolute information encapsulated within the contract, it is possible for the content of a contract to be relative. For example, the body might comprise a URL or a command which when executed returns a value, and it is this value rather than that of the URL or command that is used to generate either the validity or sealing signature. So if the contract were a share certificate, the command at contract generation time might return "BOUGHT" and the contract would be sealed based on this value. If the shares were subsequently sold, the share certificate contract would never validate as the result of the command would be, "SOLD" and so the signature would not be valid.

As mentioned above, with the increase in capabilities of smartcards, it is possible to largely rely on a CMS running in a smartcard, with the smartcard also holding a copy of a user's private key. With the smartcard connected to an unsecured terminal, a package of modest size could be passed into the smartcard CMS for signing and then returned.

In commercial terms, apart from royalties for each machine a CMS is installed on, the validation signature for a package represents the moment that a package becomes 'official' and offers revenue-earning opportunities. Any change in the package rules requires a new validation signature to be issued. By forwarding the partly completed package to a server on the Internet, along with payment, the server could complete the process and return the completed package.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A digital file forming a contract comprising:
   a header package having rules defining sealed packages produced by a sealing party, a body containing at least a portion of the content of the contract; and a validating signature generated from said rules and said body according to a first key belonging to a validating party; and
   a sealing signature generated from said header package and said sealed packages according to a second key belonging to said sealing party.

2. A digital file forming a contract according to claim 1 wherein said header package further comprises a unique header identifying a type of said sealed package and wherein said validating signature is generated from said rules, said body and said header.

3. A digital file forming a contract according to claim 1 wherein said sealed package comprises a unique number generated by said sealing party and said sealing signature is generated from said header package, any of said sealed packages and said unique number.

4. A digital file according to claim 1 wherein said rules define one or more unsealed packages to be included in said sealed package, said body comprises a HTML file and one of the unsealed packages defined in the rules contains data for a field in the HTML file.

5. A digital file according to claim 1 wherein said rules comprise a URL corresponding to the location for which each sealed package to be included in the contract can be obtained.

6. A digital contract according to claim 5 wherein said URL is a CGI script for commanding a remote server to generate said sealed package.

7. A digital contract according to claim 5 wherein said URL identifies the location of said sealed package.

8. A contract management apparatus for validating a digital file const contract, said digital file having a header package which includes rules defining sealed packages, a body containing at least a portion of the contract, and a validating signature, comprising:
   means for reading said rules and for identifying a validating party and a sealing party which created a sealed file of said contract;
   first means for obtaining a first key belonging to said validating party cooperable with said validating signature generated from said rules and body to validate said header package;
   second means for obtaining a second key belonging to said sealing party cooperable with said sealing signature to validate said contract; and
   means for iteratively validating any sealed packages contained in said contract using said second key and sealing signature.

9. A contract management apparatus as claimed in claim 8 wherein said iterative validating means returns any data stored in said sealed packages.

10. The contract management apparatus of claim 9 further comprising means for displaying said body contents and said returned data.

11. The contract management apparatus of claim 8, including one of a smartcard, a personal digital assistant, a personal computer, a terminal or an embedded system.

12. A contract management apparatus for generating a digital file constituting a contract comprising:
    means for obtaining a header package for said contract;
    means for reading rules defining sealed data packages, and for identifying a sealing party and any sealed packages to be included in said contract;
    means for obtaining said identified sealed packages;
    means for generating a sealing signature from said header package and any of said sealed packages according to a first key belonging to said sealing party; and means for assembling said header package, sealed packages and said sealing signature into said digital file constituting a contract.

13. A computer product for storing instructions which are executed by a computer to validate a digital file having a header package which includes rules defining sealed packages, a body containing at least a portion of a contract and a validating signature, comprising:
    reading said digital file and identifying a validating party and a sealing party which created a sealed package of said contract;
    deriving a first key belonging to a validating party;
    validating said header package using said first key and said validating signature;
    deriving a second key belonging to said sealing party;
    a sealing signature from said header package; and
    validating said digital file using said second key and said sealing signature.

14. The computer product according to claim 13, further comprising instructions for deriving said sealing signature from a unique number contained in said header package.

15. A computer product for storing ins ons for a computer to execute the steps of:
    storing rules to describe a data package;
    creating from said rules a data package containing a digital data file; merging said rules and said data package into a merged file;
    creating a package validity signature from said merged file to prevent unauthorized use of said digital file; and
    generating a unique number identifying said digital file;
    merging said package validity signature, said merged file and said unique number;

creating a sealing signature from said merged files; and sealing said merged files with said sealing signature to produce a sealed package.

16. A computer product according to claim 15 wherein said rules comprises a plurality of elements which point to a location on said computer containing a requited package.

17. The computer product according to claim 16 wherein said rules define a sealing signature for said sealed package.

18. The computer product according to claim 15 wherein said merged files are compressed as a single file.

* * * * *